US011295007B2

(12) United States Patent
Graber et al.

(10) Patent No.: US 11,295,007 B2
(45) Date of Patent: Apr. 5, 2022

(54) SANDBOXED APPLICATION EXTENSIONS

(71) Applicant: Tableau Software, LLC, Seattle, WA (US)

(72) Inventors: Lee Benjamin Graber, Seattle, WA (US); Michael Brian Kovner, Seattle, WA (US); Sean Daye Mann, Seattle, WA (US); Brett Allen Taylor, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 123 days.

(21) Appl. No.: 16/702,410

(22) Filed: Dec. 3, 2019

(65) Prior Publication Data

US 2021/0165873 A1    Jun. 3, 2021

(51) Int. Cl.
  *G06F 21/53* (2013.01)
  *G06F 21/12* (2013.01)
  *H04L 29/06* (2006.01)
  *G06F 21/55* (2013.01)

(52) U.S. Cl.
  CPC ............ *G06F 21/53* (2013.01); *G06F 21/128* (2013.01); *G06F 21/552* (2013.01); *G06F 21/554* (2013.01); *H04L 63/20* (2013.01)

(58) Field of Classification Search
  CPC ...... G06F 21/53; G06F 21/128; G06F 21/554; H04L 63/20
  See application file for complete search history.

(56) References Cited

U.S. PATENT DOCUMENTS

| 10,009,317 | B2* | 6/2018 | Woolward | H04L 63/20 |
|---|---|---|---|---|
| 10,162,624 | B1* | 12/2018 | Moturu | G06F 9/44521 |
| 10,452,843 | B2* | 10/2019 | Dykes | G06N 20/00 |
| 10,564,988 | B1* | 2/2020 | Jose | G06F 9/541 |
| 10,592,676 | B2* | 3/2020 | Sawhney | G06F 21/577 |
| 10,732,952 | B1* | 8/2020 | Yu | G06F 8/60 |
| 10,809,991 | B2* | 10/2020 | Tung | G06F 16/1734 |
| 2007/0226773 | A1* | 9/2007 | Pouliot | G06F 21/53 726/1 |
| 2011/0145926 | A1* | 6/2011 | Dalcher | G06F 21/53 726/26 |
| 2014/0075555 | A1* | 3/2014 | Shilimkar | G06F 21/56 726/23 |

(Continued)

*Primary Examiner* — Viral S Lakhia
(74) *Attorney, Agent, or Firm* — John W. Branch; Branch Partners PLLC

(57) ABSTRACT

Embodiments are directed to managing sandboxed application extensions. A first request that include includes information that identifies an extension may be provided to an extension server. Information included in a first response may be employed to instantiate an extension shell that corresponds to the extension and embed it in the hosting application such that the extension shell is associated with a first security policy included in the first response. A second request may be provided to the extension server based on information included in the extension shell such that the second request includes an identifier associated with an extension body that corresponds to the extension shell. The first security policy or the second security policy may be employed to enable one or more of the extension shell or the extension body to just access the hosting application or just access the extension server.

20 Claims, 11 Drawing Sheets

(56) References Cited

U.S. PATENT DOCUMENTS

| | | | |
|---|---|---|---|
| 2015/0281318 A1* | 10/2015 | Warner | G06F 16/95 709/217 |
| 2017/0039379 A1* | 2/2017 | Skipper | H04L 63/20 |
| 2017/0076103 A1* | 3/2017 | Chen | G06F 21/604 |
| 2017/0185768 A1* | 6/2017 | Krstic | G06F 9/54 |
| 2019/0065736 A1* | 2/2019 | Dharmadhikari | G06F 21/55 |
| 2019/0297122 A1* | 9/2019 | Harrison | G06F 21/10 |
| 2020/0042713 A1* | 2/2020 | Robertson | G06F 11/3051 |
| 2020/0175152 A1* | 6/2020 | Xu | G06F 21/14 |

* cited by examiner

```
Content-Security-Policy:
default-src 'none';
frame-src https://hostna.me/sandbox-content/extension-id/page.html;
style-src 'unsafe-inline';
script-src https://hostna.me/scripts/frame-bootstrap.js;
```
— 802

```
<!DOCTYPE html>
<html lang="en">
<head>
    <script src="https://hostna.me/scripts/frame-bootstrap.js"></script>
</head>
<body>
    <iframe
    src="https://hostna.me/sandbox-content/extension-id/page.html"
    style="..."
    sandbox="allow-scripts">
    </iframe>
</body>
</html>
```
— 804, 808

```
Content-Security-Policy: default-src https://hostna.me/sandbox-content/extension-id/;
```
— 806

*Fig. 8*

SANDBOXED APPLICATION EXTENSIONS

TECHNICAL FIELD

The present invention relates generally to computer applications, and more particularly, but not exclusively to, sandboxing of application extensions.

BACKGROUND

Increasingly, organizations employ various computer applications in their day-to-day operations. Accordingly, application vendors strive to develop and provide applications that meet the current or future needs of various organizations. However, many organizations have specialized needs that would be difficult or unwieldy to include in applications. Attempting to include all requested features in a single application may be beyond the capabilities of most application vendors. Accordingly, in some cases, applications may be arranged to provide a plugin architecture that enables other vendors to additional features via extensions that may be dynamically integrated into applications. Enabling a plug-in architecture solves one part of the problem, it enables other vendors to provide additional features for an application rather than requiring the application vendor to provide all the features. However, the introduction of extensions provided by third party vendors can introduce security risks that may be difficult for the original application vendor to mitigate. Letting customers install extensions can expose them to undesirable risk. Typically, customers will be unable or unwilling to audit extension source code to validate that the extensions are safe. Accordingly, the responsibility for protecting customers from malicious or undesirable actions performed by extensions may become the responsibility of the application vendor. However, validating extensions at scale may be a difficult challenge for application vendors. Thus, is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates an example of a portion of sandbox information for a sandboxed application extensions in accordance with one or more of the various embodiments;

DETAILED DESCRIPTION OF VARIOUS EMBODIMENTS

Figure 1:
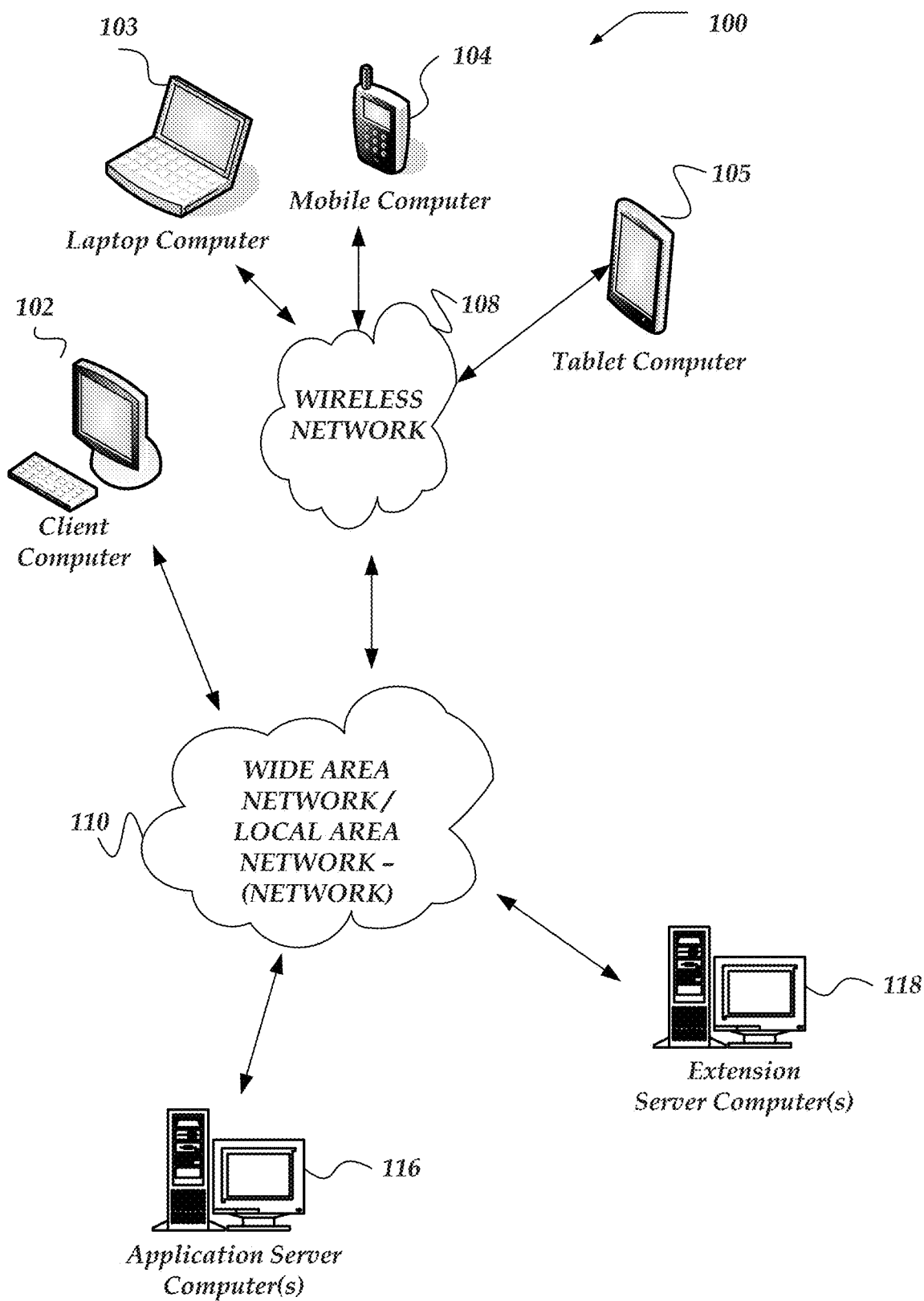
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As used herein the term "Content Security Policy (CSP)" refers to generally to a security policy configuration that may be assigned to one or more portions of an application extension. In some cases, if the application extension may be based on standard protocols, CSP may be based on conventional standards. For example, if the application extension is based on HTTP/HTML/Web technology, CSP may refer to a security layer that detects and restricts various actions of a web page or web application client.

As used herein the "security policy" refers to the rules and configuration that may be employed to define the actions that application extensions may be allowed to perform while host in an application. A security policy may be enforced or implemented using a combination of standard or conventional configuration setting. Accordingly, in some cases, if the application extension is based on web compatible technologies some sandboxing behavior may be implemented using CSP configurations that may be supported by standard or common web clients or panels used to host application extensions. In some cases, application extension sandboxing may be based on a combination of convention CSP and other web compatible configuration.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing sandboxed application extensions. In one or more of the various embodiments, a first request may be provided to an extension server such that the first request includes information that identifies an extension of a hosting application. In one or more of the various embodiments, providing the first request may include providing a Hypertext Transfer Protocol (HTTP) request that includes a Uniform Resource Locator (URL) associated with the extension server and the extension.

In one or more of the various embodiments, information included in a first response may be employed to instantiate an extension shell that corresponds to the extension and embed it in the hosting application such that the extension shell is associated with a first security policy included in the first response.

In one or more of the various embodiments, a second request may be provided to the extension server based on information included in the extension shell such that the second request includes an identifier associated with an extension body that corresponds to the extension shell. In one or more of the various embodiments, providing the second request to the extension server may include: providing a Uniform Resource Locator (URL) associated with the extension server and the extension body based on information corresponding to an IFRAME tag included in the extension shell; providing a Hypertext Transfer Protocol (HTTP) request that includes the URL to the extension server; or the like.

In one or more of the various embodiments, additional information included in a second response may be employed to instantiate the extension body and embed it in the extension shell such that the extension body is associated with a second security policy that is included in the second response. In one or more of the various embodiments, instantiating the extension body embedded in the extension shell may include: providing one or more additional requests to the extension server based on information in the extension body such that the one or more of the first security policy or the second security policy enable the one or more additional requests to reach a network address associated with the extension server, and such that the one or more of the first security policy or the second security policy disable the one or more requests from reaching network addresses unassociated with the extension server; employing one or more additional responses to instantiate one or more portions of the extension body; or the like.

In one or more of the various embodiments, one or more of the first security policy or the second security policy may be employed to enable one or more of the extension shell or the extension body to just access the hosting application or just access the extension server.

In one or more of the various embodiments, one or more of the first security policy or the second security policy may be compatible with one or more computer security standards such that the one or more computer security standards include Content Security Policy (CSP).

In one or more of the various embodiments, enabling the extension body to access one or more prescribed application resources such that the one or more prescribed application resources may include one or more application programming interfaces (APIs) that may enable controlled access to one or more application resources.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, extension server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, extension server computer 118, or other computers.

Client computers 102-105 may further be configured to include a client application that enables an end-user to log into an end-user account that may be managed by another computer, such as application server computer 116, extension server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, extension server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, extension server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116, extension server computer 118 are described in more detail below in conjunction with FIG. 3. Although FIG. 1 illustrates application server computer 116, extension server computer 118, or the like, each as a single computer, the innovations or embodiments are not so limited. For example, one or more functions of application server computer 116, extension server computer 118, or the like, may be distributed across one or more distinct network computers. Moreover, in one or more embodiments, application server computer 116, extension server computer 118 may be implemented using a plurality of network computers. Further, in one or more of the various embodiments, application server computer 116, extension server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
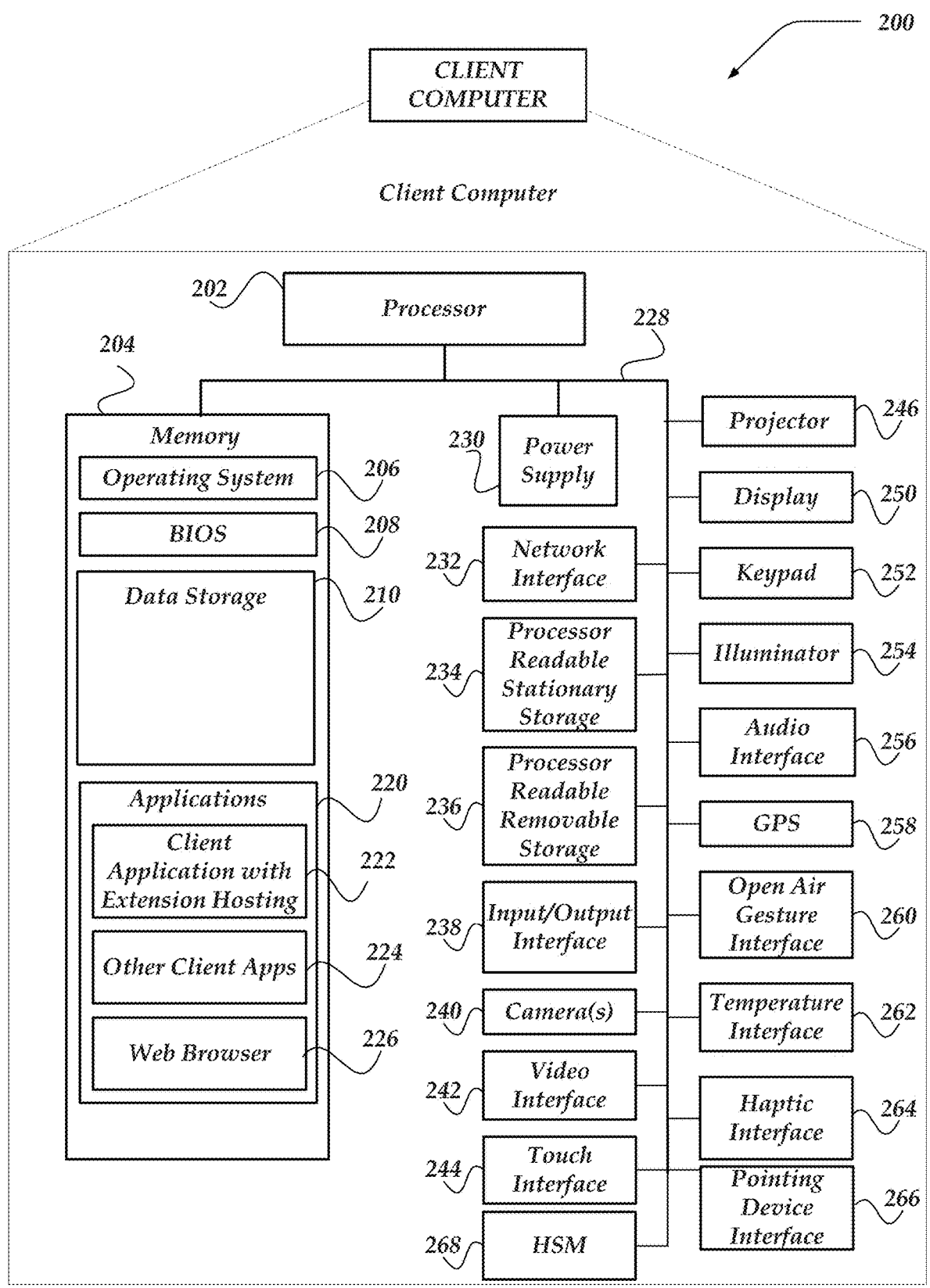
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client application with extension hosting 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
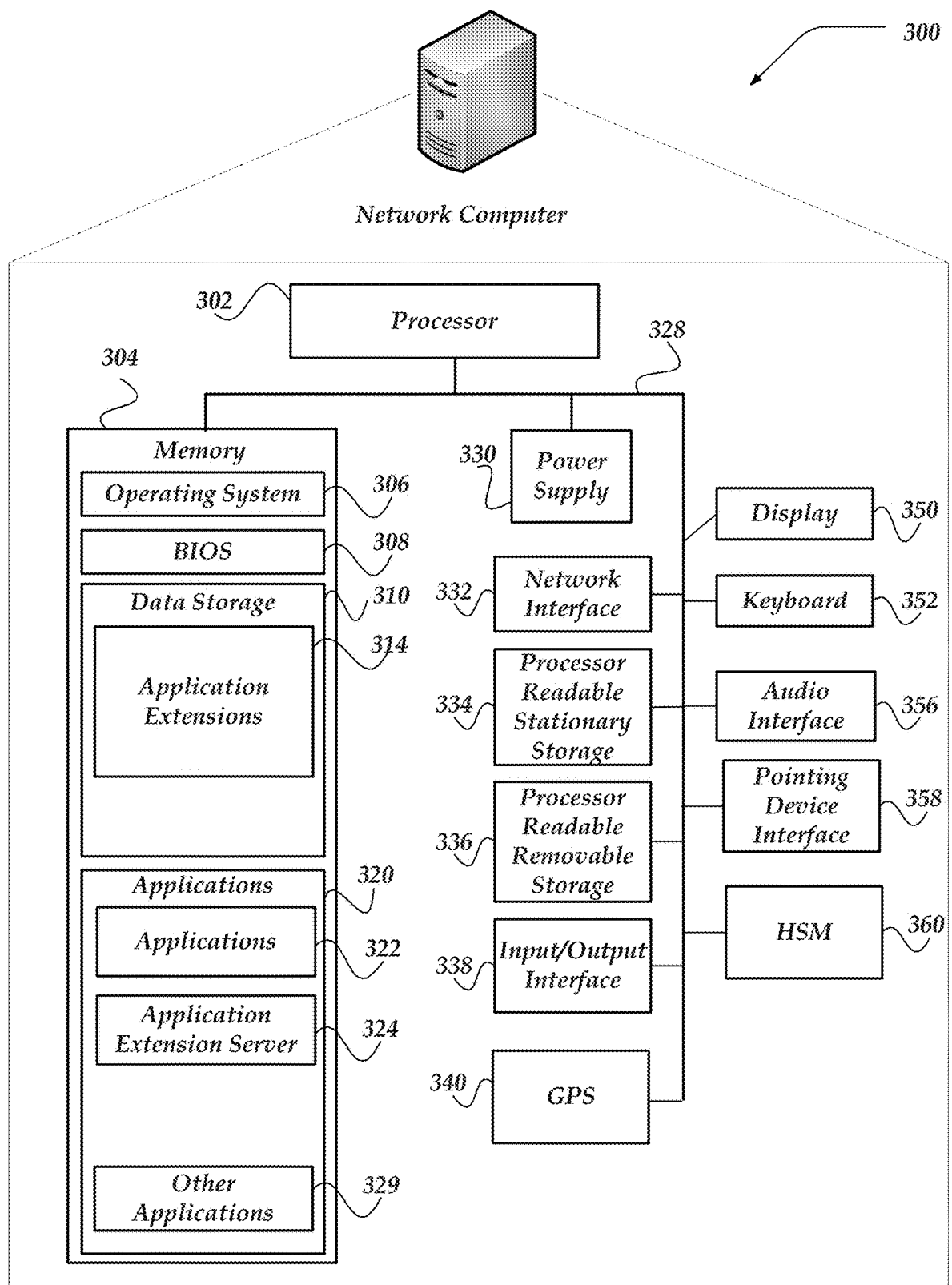
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, extension server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, applications 322, application extension server 324, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, application extensions 314, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include applications 322, application extension server 324, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, applications 322, application extension server 324, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to applications 322, application extension server 324, other applications 329, or the like, may be provisioned and de-commissioned automatically.

Also, in one or more of the various embodiments, applications 322, application extension server 324, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
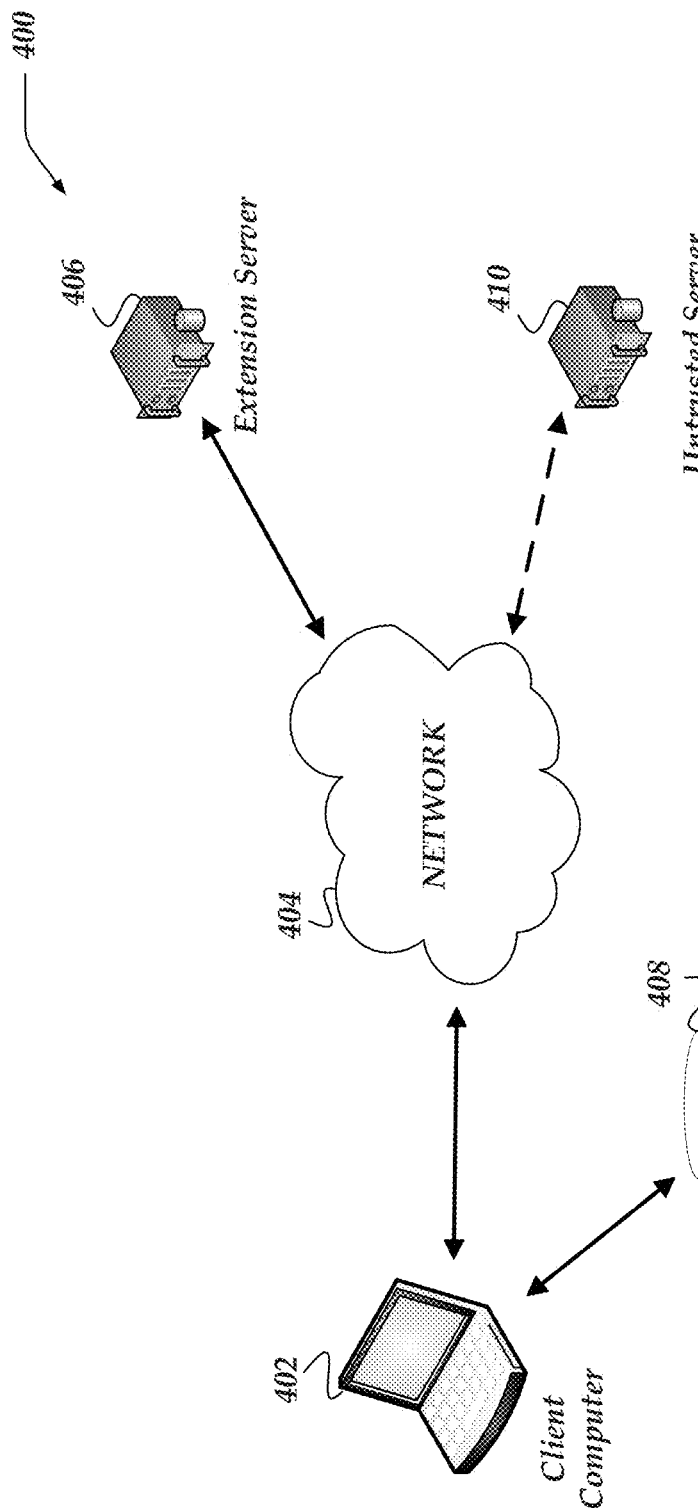
FIG. 4 illustrates a logical architecture of a system for sandboxed application extensions in accordance with one or more of the various embodiments.

FIG. 4 illustrates a logical architecture of system 400 for sandboxed application extensions in accordance with one or more of the various embodiments. In one or more of the various embodiments, system 400 may be comprised of various components, including, client computer 402, network 404, extension server 406, sensitive data store 408, untrusted server computer 410, or the like.

In one or more of the various embodiments, client computer 402 may be a computer that users employ to execute one or more applications that may be arranged to support sandboxed extensions in accordance with one or more of the various embodiments. In some embodiments, the extensions may be provided from extension server 406 via network 404. In some embodiments, client computer 402 may be considered similar to client computer 200. Likewise, in some embodiments, extension server 406 or untrusted server computer 410 may be considered similar to network computer 300. (Except that untrusted server computer 410 may not include applications, application extension servers, application extensions, or the like). And, in one or more of the various embodiments, network 404 may be considered to be similar to one or more wireless network 108, network 110, or the like.

In one or more of the various embodiments, data store 408 may include information that an organization is willing to share with one or more applications on client computer 402. However, in some embodiments, the organization may require that the information on data store 408 should be restricted to the organization and its networks. For example, in some embodiments, if the application running on client computer 402 is a data visualization application, it may require access to sensitive business information that visualizations may be based on.

In one or more of the various embodiments, absent the innovations described below, application extensions associated with applications running on client computer 402 may be enabled to exfiltrate information, such as, sensitive data from data store 408, to one or more untrusted servers, such as, untrusted server 410 via network 404.

Accordingly, in one or more of the various embodiments, an extension framework that prevents application extensions from exfiltrating sensitive information may be advantageous.

In one or more of the various embodiments, application extensions may be provided from one or more extension servers, such as, extension server 406. Accordingly, in one or more of the various embodiments, application extension platforms may be arranged to have access over the network to obtain the components or assets required for extensions from extension server 406.

However, in one or more of the various embodiments, application extension platforms may be arranged to enable applications to obtain extensions over the network from extension server 406 and disable such extensions from uncontrolled access of resources.

Further, in one or more of the various embodiments, application extension platforms may be arranged to employ one or more conventional protocols that enable or encourage the development of application extensions. However, absent the innovations described herein directly employing them may be disadvantageous because often conventional protocols may be directed to protecting the extension server from malicious clients rather than protecting clients from malicious extensions. Accordingly, in one or more of the various embodiments, the innovations disclosed herein at least enable extensions to be created or deployed using conventional techniques while also protecting the client from malicious extensions. For example, in some embodiments, the application extension platform may be arranged to bar application extensions from exfiltrating sensitive data from the client to other locations such as untrusted server 410.

In one or more of the various embodiments, two or more conventional protocols may be employed in combination to provide sandboxed application extensions. In one or more of the various embodiments, sandbox engines running on server computers or client computers may be arranged to determine the particular protocols or configuration thereof based on the type of application or the type of extension. In some embodiments, sandbox engines may be arranged to sandbox application extensions based on rules, instructions, or policy information provided via configuration information.

Figure 5:
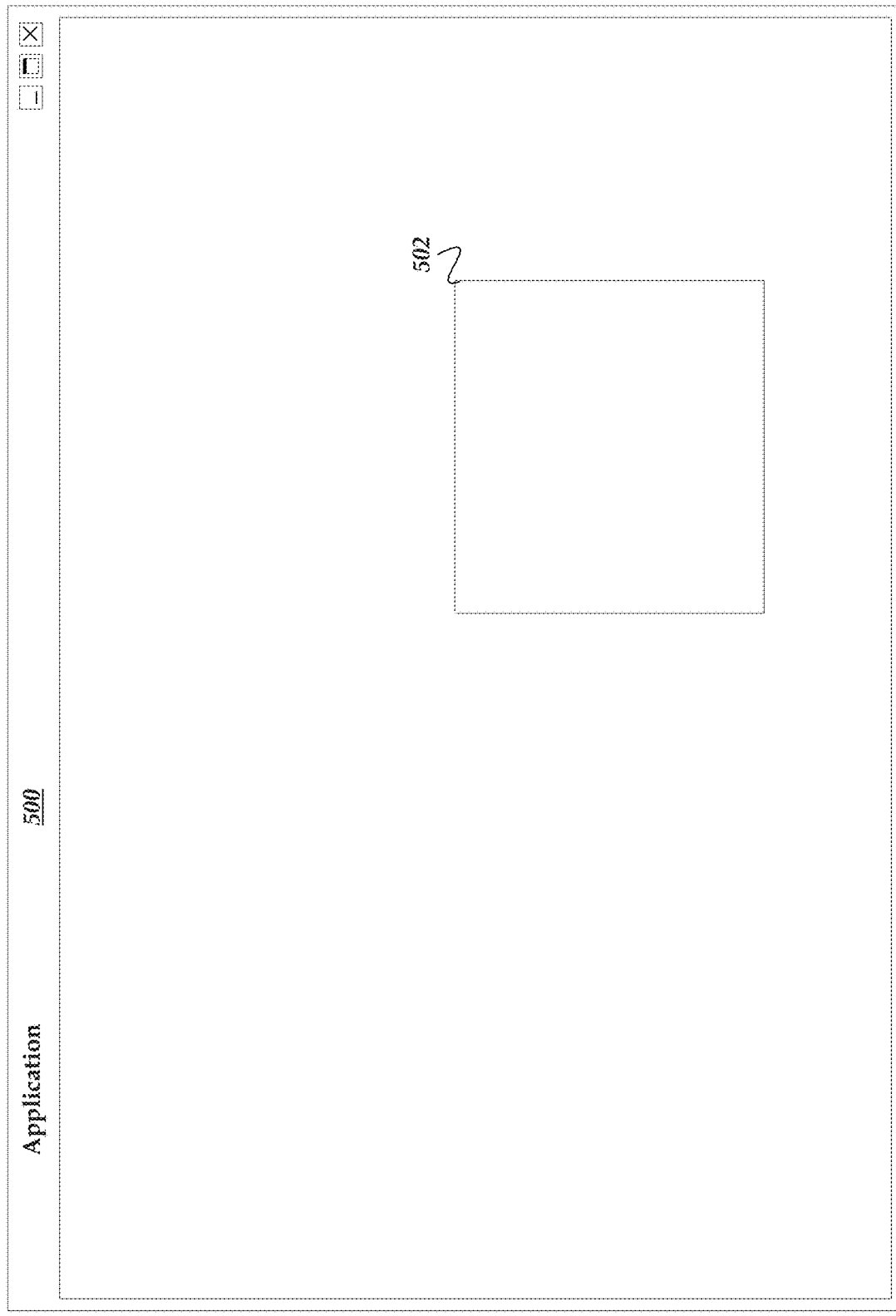
FIG. 5 illustrates logical schematic of a portion of a client application for sandboxed application extensions that is in accordance with one or more of the various embodiments.

FIG. 5 illustrates logical schematic of a portion of client application 500 for sandboxed application extensions that is in accordance with one or more of the various embodiments. In one or more of the various embodiments, applications, such as, application 500 may be arranged to be executed on client computers. In some embodiments, applications may be arranged to run on network computers or server computers as well. However, for brevity and clarity applications are described herein as running on client computers.

In one or more of the various embodiments, applications may present various user interfaces to users. In some embodiments, applications may be arranged to support application extensions. As described above, application extensions may be arranged to extend the functionality or user interface of applications. In this example, application extension 502 represents an application extension that has been added to application 500.

In some embodiments, assets associated with application extensions may be stored on remotely from the client computers on servers or services that may not be managed directly by the organization using the application that hosts the application extensions. Accordingly, in one or more of the various embodiments, application extensions assets may be provided client computers via the Internet, or the like.

In some embodiments, application extensions assets may include, source code, scripts, markup/layout code (e.g., HTML, XML, CSS, or the like), media (e.g., images, audio, video, or the like), compiled libraries, or the like, or combination thereof.

Figure 6:
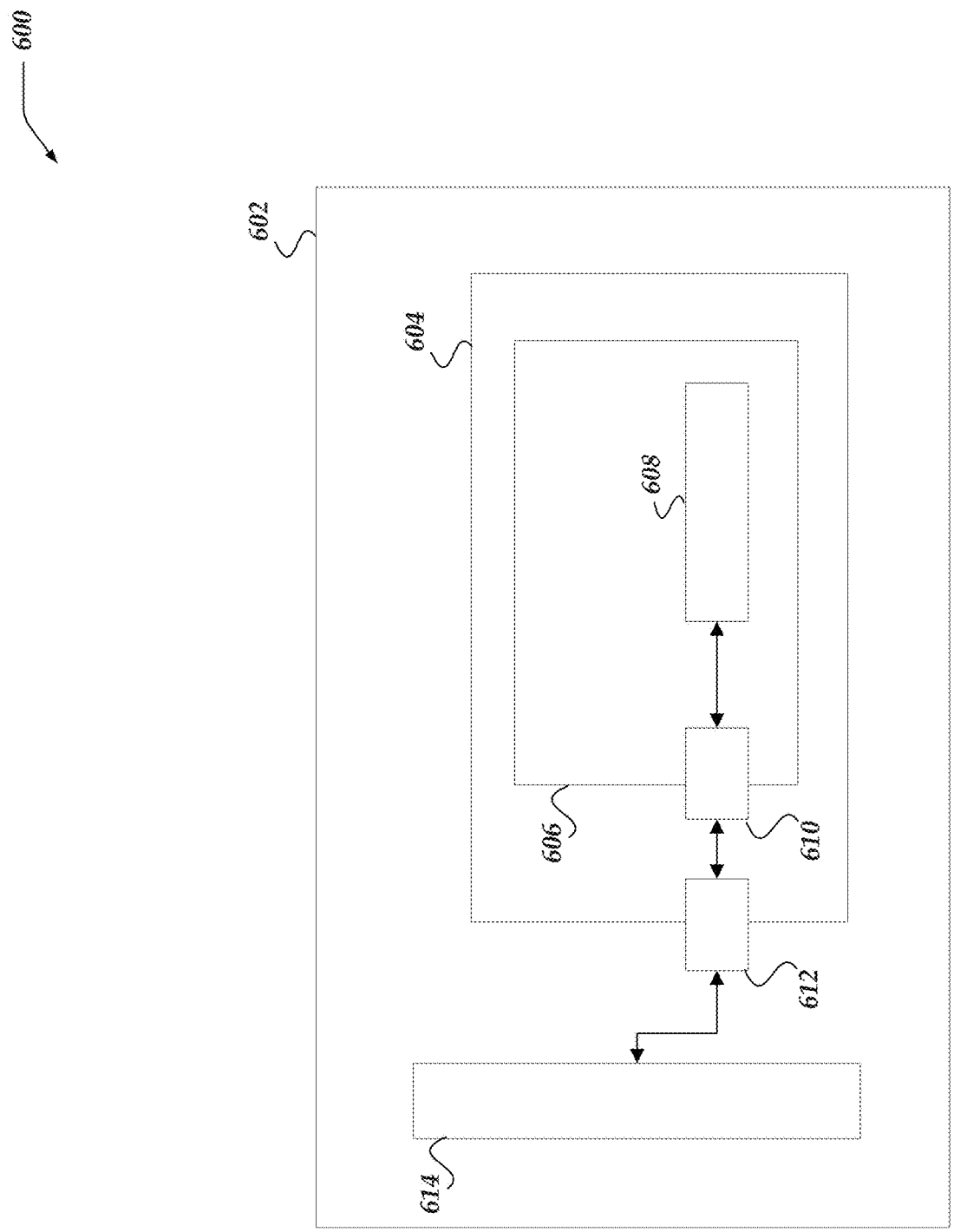
FIG. 6 illustrates a logical schematic of an application extension system for sandboxed application extensions that is in accordance with one or more of the various embodiments.

FIG. 6 illustrates a logical schematic of application extension system 600 for sandboxed application extensions that is in accordance with one or more of the various embodiments. In one or more of the various embodiments, system 600 may include application 602 that is arranged to host one or more application extensions.

In some embodiments, application 602 may be arranged to include one or more application extension shells, such as, application extension shell 604. In some embodiments, application extension shells may be arranged to provide an operative environment for application extension body 606. Accordingly, in one or more of the various embodiments, application extension body 606 may be arranged to employ one or more features of the application that may be provided via extension interface 608.

In one or more of the various embodiments, extension interface 608 may be arranged to provide a defined set of APIs that enable application extensions to interact or integrate with the underlying application. In some embodiments, application extension body may 606 may be arranged to employ interface 608 to pass messages (e.g., API calls) through communication channel 610 to extension shell 604. Accordingly, in one or more of the various embodiments, extension shell 604 may be arranged to forward messages from application extension body 606 to application interface 614 via communication channel 612. Likewise, in one or more of the various embodiments, extension shell 604 may be arranged to receive messages from application interface 614 via communication channel 612. In some embodiments, messages provided by application interface 614 may be forwarded to extension body 606 via communication channel 610.

Accordingly, in one or more of the various embodiments, application extension shell 604 may be arranged to isolate extension body 606 from application 602 to restricts its behavior. In some embodiments, the layering of application extension shell 604 and extension body 606 enables conventional security mechanisms to applied to restrict an application extension from unauthorized access of network resources. Accordingly, in some embodiments, the layering enables the security configuration of each layer to work together to restrict the application extension from accessing network resources.

Note, in some embodiments, custom application extensions may be designed to employ proprietary or unconventional methods and protocols restrictions. However, this may be disadvantageous because requiring application extension authors to use proprietary or unconventional methods may limit or discourage them from authoring application extensions.

Accordingly, in one or more of the various embodiments, application extension platforms that include an unconventional of layering conventional protocols enable the desired restrictions while enabling application extension authors to use standard tools or techniques to create application extensions.

Figure 7:
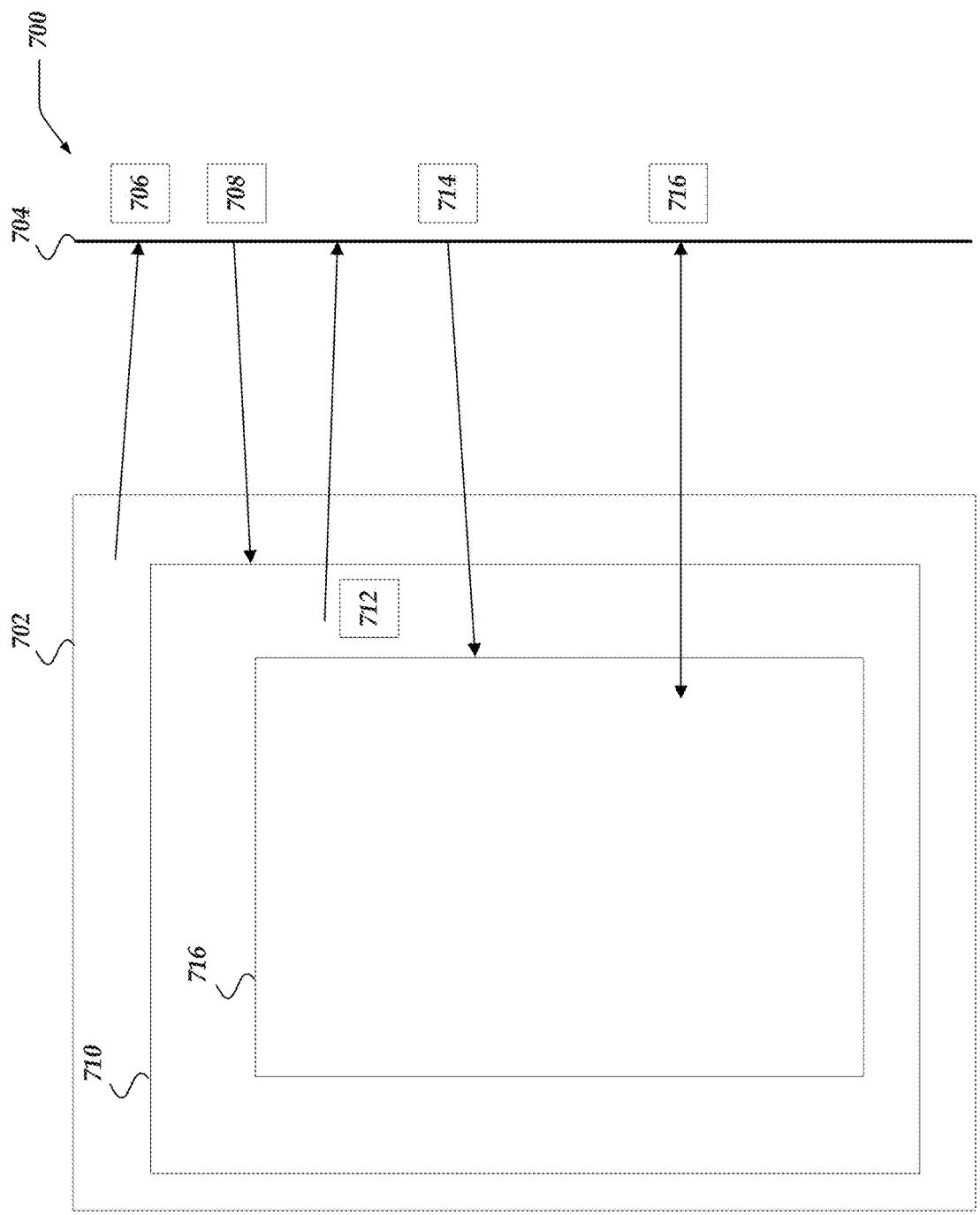
FIG. 7 illustrates a portion of a sequence of actions performed by a system for sandboxed application extensions in accordance with one or more of the various embodiments.

FIG. 7 illustrates a portion of a sequence of actions performed by system 700 for sandboxed application extensions in accordance with one or more of the various embodiments. In one or more of the various embodiments, an application, such as, application 702 may be arranged to host application extensions. Accordingly, in one or more of the various embodiments, application 702 may be arranged to obtain an application extension from application extension server 704.

At step 706, in some embodiments, application 702 may provide an initial request to application extension server 704. In one or more of the various embodiments, the format of requests may be arranged to be consistent with the communication or application protocols supported by the application extension server. In some embodiments, the request may include information that at least identifies the application extension of interest. In some embodiments, other information included in the request may include credential information to identify the client computer, user, organization, or the like. However, in some embodiments, one or more custom or conventional methods may have been employed to authenticate the request or establish a secure communication channel. For example, in some embodiments, HTTPS over TCP/IP may be employed to exchange information between applications and application extension servers. Accordingly, one or more custom or conventional techniques, such as, Transport Layer Security (TLS), or the like, may be employed to establish an authenticated secure communication channel between application 702 and application extension server 704. Accordingly, in one or more of the various embodiments, applications may be arranged to employ rules, security policies, certificates, credential information, or the like, that may be provided via configuration information.

In some embodiments, the request may be formatted as an URL or URI that includes various information that enables the application extension server to determine which application extension is being requested, who is requesting it, where to deliver the application assets, or the like. For example, an application extension platform that supports hosting applications or extensions using web technologies may generate an initial application extension request such as:

https://extension.server/sandbox/main.html

In this example, for some embodiments, the above described request may be communicated to application extension server 704 using an established HTTPS session. Accordingly, for brevity and clarity well-known details regarding the transport protocol, or the like, such as TCP/IP header information, HTTPS handshakes, or the like, are omitted here.

At step 708, in some embodiments, application extension server 704 may be arranged to provide application extension shell information to the application that is requesting the application extension. In some embodiments, information provided with the request (e.g., source network address information, credentials, or the like) may be employed to determine where to provide the application extension shell. In some embodiments, configuration information associated with the application extension shell may be provided to the requesting application. Accordingly, in some embodiments, security configuration information may be sent from the application extension servers to the requesting application.

In one or more of the various embodiments, the application extension shell information may be arranged to include the information that enables application extension shell 710 to request the application extension body associated with requested application extension. In one or more of the various embodiments, the application extension server may be arranged to generate some or all of the application extension shell on the fly in response to application extension requests. Likewise, in some embodiments, one or more portions of the application extension shell information may be pre-made or otherwise stored and made available to the application extension server such that the application extension server may be arranged to provide the application extension shell (and its associated information) as-is to the requesting application. In some embodiments, the application extension shell information may be comprised of static or pre-defined information that may be common to more than one application extension as well as dynamically generated information that may be specific to the requested application extension.

In some embodiments, the application extension shell may be arranged to include a path to HTML content used to set up page level security, such as, CSP headers, IFRAME source attributes, or the like.

In some embodiments, the application extension shell may be arranged to include information the identifies the application extension body information for the application extension. For example, in some embodiments, the application extension shell may be an HTML IFRAME that is provided via HTTP/HTTPS with the appropriate CSP headers and a sandbox attributes that protects against NAV and SUB data exfiltration. For example, for some embodiments, setting the CSP on 'frame-src' for the application extension shell page disables navigating away from the initial URL. See, CSP headers 802 in FIG. 8.

At step 708, in one or more of the various embodiments, the application extension server may provide the application extension shell information to the requesting application. Accordingly, in one or more of the various embodiments, application 702 may create an application extension shell, such as, application extension shell 710 based on the information provided by the application extension server.

At step 712, in one or more of the various embodiments, the application may be arranged to unpack the application extension shell information. Accordingly, in one or more of the various embodiments, information included with the application may be employed to generate a request for the application extension body.

In some embodiments, application extension shell 710 may include an embedded HTML IFRAME that has its source tag set to the URL of application extension body. Accordingly, in one or more of the various embodiments, a message requesting the application extension body may be automatically generated and communicated to the application extension server after the HTML code that may be part of the application extension shell is rendered in application extension shell 710.

At step 714, in one or more of the various embodiments, the application extension server may receive the application extension body request. Accordingly, in some embodiments, the application extension server may be arranged to determine and prepare a response that includes the information for creating the application extension body.

In one or more of the various embodiments, the response that includes the application extension body information may include security configuration information that puts restrictions on how the application extension may access the network.

For example, if the application extension is based on web technologies, the application extension body may be returned with CSP that limits network access for the extension body to URL that are sub-paths of the base URL associated with the extension. See, message content 804 in FIG. 8.

At step 716, in one or more of the various embodiments, the application extension body may generate one or more requests that may be sent to application extension server 704. And, likewise, application extension server 704 may generate one or more responses. However, in one or more of the various embodiments, the security policy associated with the application extension body may restrict the requests sent by the application extension body to be directed to the application extension server.

Likewise, the security policy associated with the application extension shell may protect the greater application from other disruptive actions that may be attempted by the application extension body.

For example, in some embodiments, if the application extension platform is based on web technologies, the CSP of the application extension body restricts the network access of the application extension body and the CSP of the application extension shell prevents the application extension body from using DOM navigation actions to break out of the application extension platform. Thus, in one or more of the various embodiments, separating the requests for the application extension shell from the application extension body enables the application extension shell to have different CSP than the application extension body. Accordingly, in some embodiments, security policy of the application extension shell can protect the application by limiting the actions of the application extension body that may be harmful, while still giving the application extension author wide latitude as long as the application extension body does not make network requests to unauthorized locations. In contrast, absent the application extension shell, CSP that protects the application could be added to the application extension body, but may restrict the application extension from navigating within the application extension body, and so on.

FIG. 8 illustrates an example of a portion of sandbox information 800 for sandboxed application extensions in accordance with one or more of the various embodiments. As discussed above, in some embodiments, application extension platforms used by applications may be arranged to employ standard or conventional protocols to enable application extension developers to create application extensions without relying on proprietary protocols or programming systems. Accordingly, in one or more of the various embodiments, sandbox information 800 includes a portion of the information provided by the application extension server to enable sandboxed application extensions.

In this example, information 802 illustrates an example of sandbox information that an application extension server may send to an application that is requesting to host a sandboxed extension. In this example, the application extension platform (not shown) is arranged to employ Content Security Policy (CSP) information 806 to enforce portions of the security policies associated with the application extension shell.

Also, in this example, for some embodiments, information 804 illustrates an example of information for creating an application extension body for sandboxed application extensions. In this example, information 804 illustrates a portion of the application extension shell. In this example, the application extension shell may be arranged to include an iframe element that may serve to host the application extension body. In this example, uri 808 is a URI that is pointing to the application extension server. In this example, the information associated uri 808 may be retrieved from the application extension server. This information may include the markup language, styling, assets, scripts, or the like, that may comprise the application extension.

In this example, information 804 may include requested from within the application extension shell. In some embodiments, the application extension shell may itself include an iframe that the application extension body may be loaded into.

Generalized Operations

Figure 9:
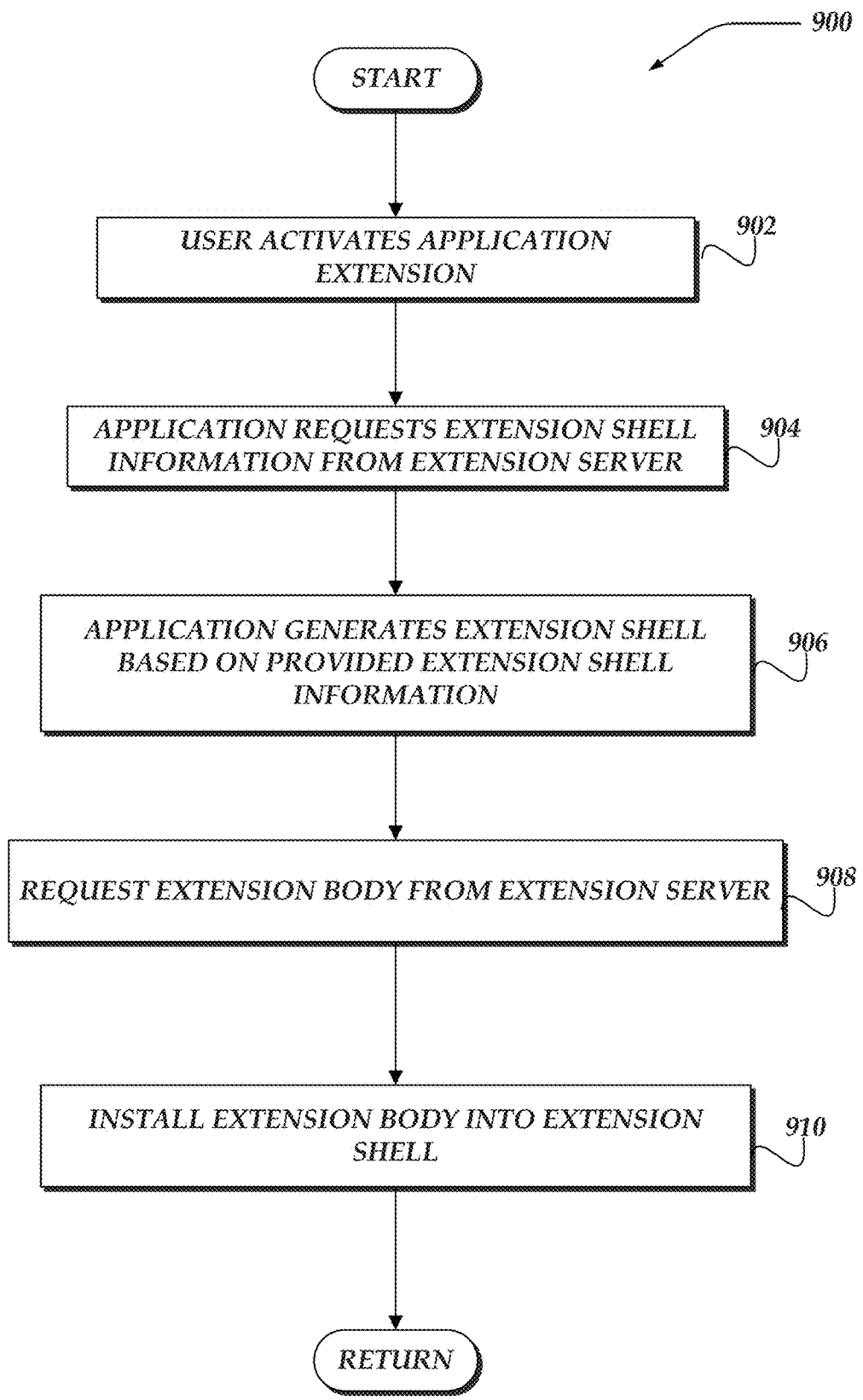
FIG. 9 illustrates an overview flowchart for a process for sandboxed application extensions in accordance with one or more of the various embodiments.
Figure 10:
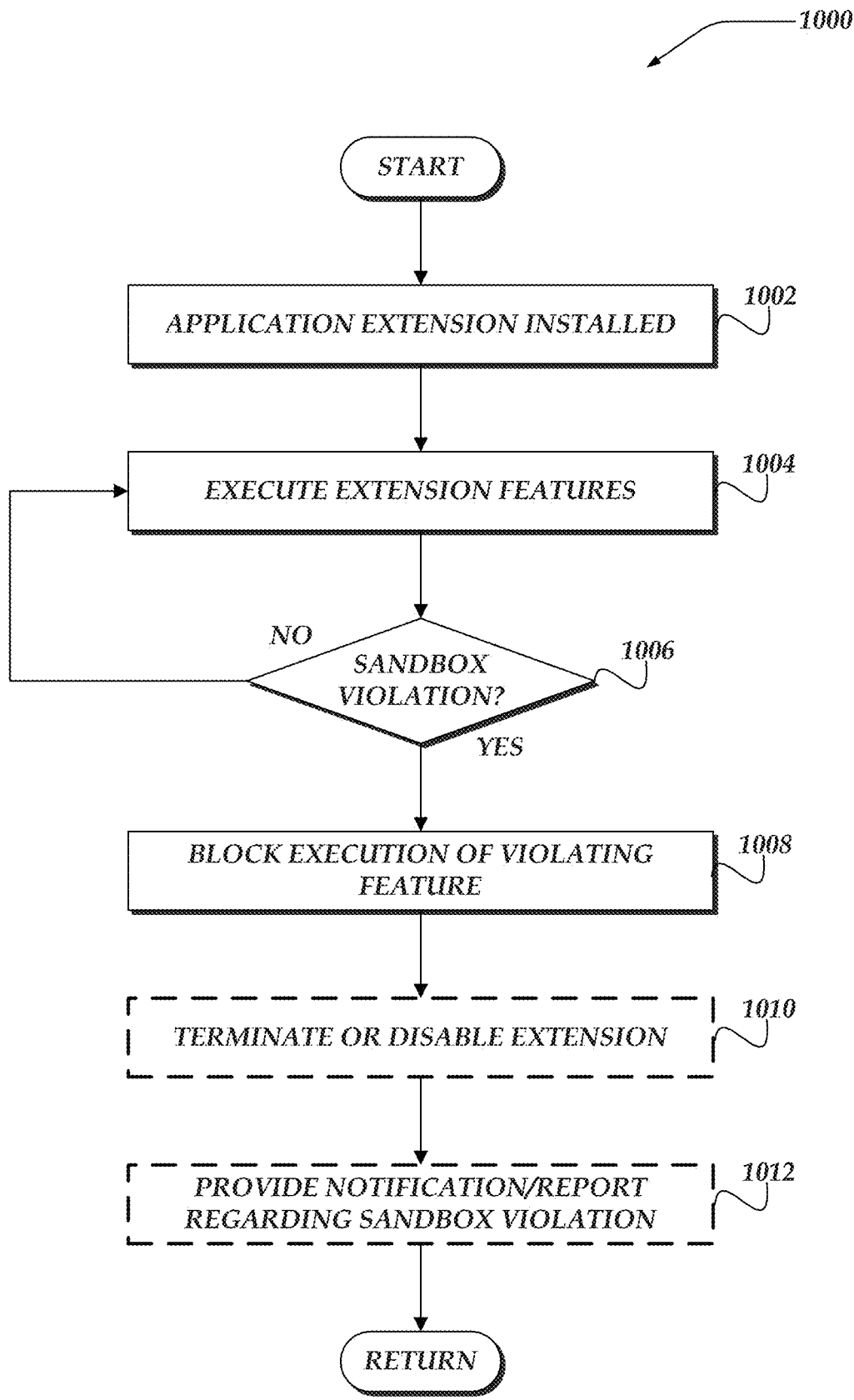
FIG. 10 illustrates a flowchart for a process for securing an application extension in accordance with one or more of the various embodiments.
Figure 11:
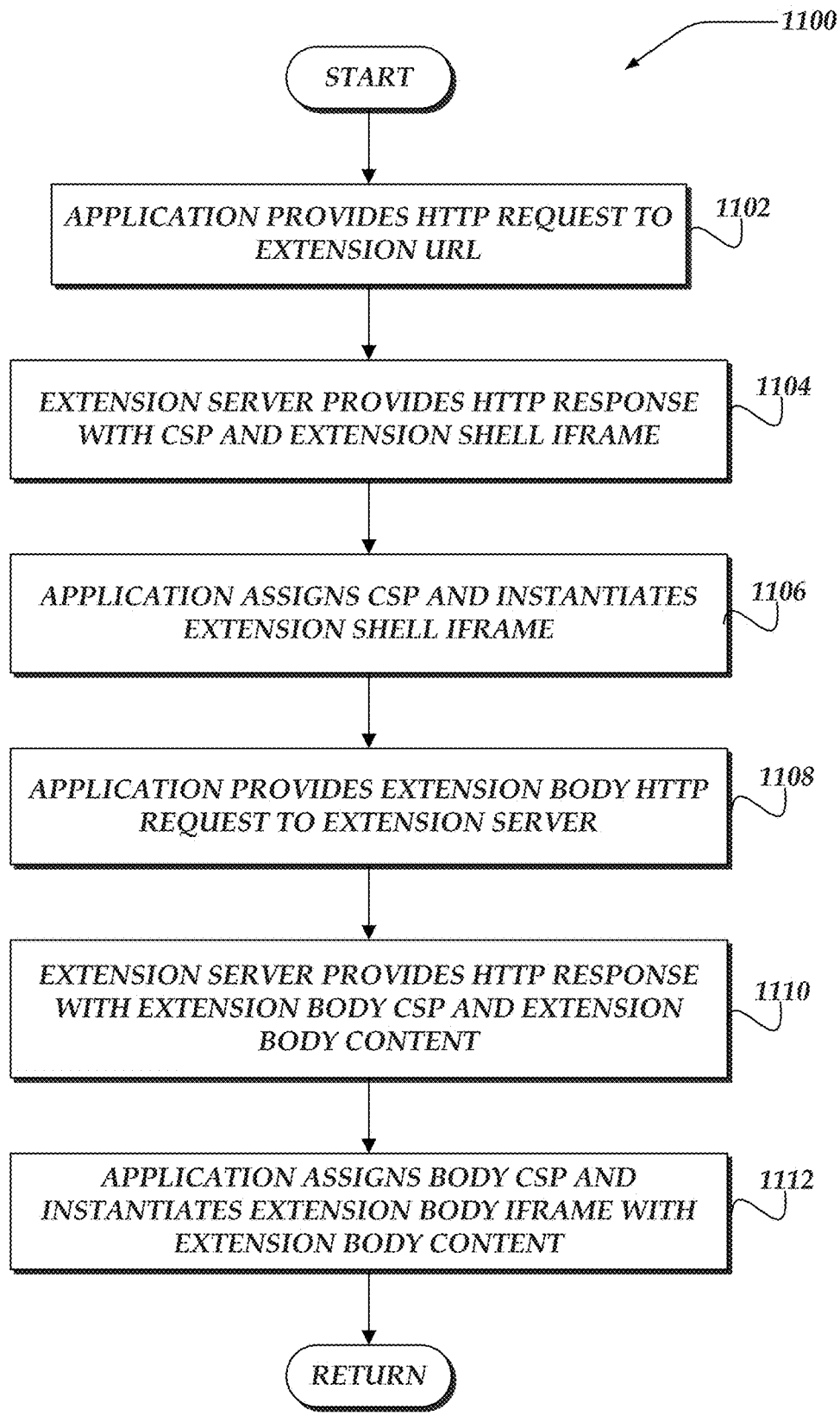
FIG. 11 illustrates a flowchart for a process for sandboxed application extensions in accordance with one or more of the various embodiments.

FIGS. 9-11 represent generalized operations for sandboxed application extensions in accordance with one or more of the various embodiments. In one or more of the various embodiments, processes 900, 1000, and 1100 described in conjunction with FIGS. 9-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may be used for sandboxed application extensions in accordance with at least one of the various embodiments or architectures such as those described in conjunction with FIGS. 4-8. Further, in one or more of the various embodiments, some or all of the actions performed by processes 900, 1000, and 1100 may be executed in part by applications 322, application extension server 324, or the like, executed by one or more processors of one or more network computers. Also, in one or more of the various embodiments, some or all of the actions performed by processes 900, 1000, and 1100 may be executed in part by client applications with extension hosting 222, executed by one or more processors of one or more client computers.

FIG. 9 illustrates an overview flowchart for process 900 for sandboxed application extensions in accordance with one or more of the various embodiments. After a start block, at block 902, in one or more of the various embodiments, a user may activate one or more application extensions in an application that supports an application extension platform. In some embodiments, the application extension platform may be designed to enable application extensions to communicate freely with outside servers rather than being restricted to locally provided extensions.

At block 904, in one or more of the various embodiments, the application may be arranged to request extension shell information from an extension server. In one or more of the various embodiments, the format of the request may be arranged to be compatible with the technology used to implement the application extension shell. For example, if the application extension shell is an HTML page, the request may be a HTTP request that directed to the application extension server.

At block 906, in one or more of the various embodiments, the application may be arranged to generate an extension shell based on the provided extension shell information. In response to the first request, the application extension server may provide information or content for the application extension shell. Accordingly, the application may be arranged to instantiate an application extension shell for the requested application extension.

At block 908, in one or more of the various embodiments, the application may be arranged to request the extension body from the extension server. As described above, the application extension shell may include information that enables the application automatically generate a second request for the application extension body. In some embodiments, the application extension body may include arbitrary content as provided by the author of the application extension. However, in one or more of the various embodiments, security policy information assigned to the application extension body may be provided by application extension server. Thus, the author of the application extension may be disabled from setting the security policy for the application extension body.

At block 910, in one or more of the various embodiments, the application may be arranged to install the extension body into the extension shell. In one or more of the various embodiments, the application automatically instantiates the application extension body inside the application extension shell. Accordingly, the security policy associated with the application extension shell and the security policy information associated with the application extension body work in combination to provide the restrictions that sandbox the application extension.

Next, in one or more of the various embodiments, control may be returned to a calling process.

FIG. 10 illustrates a flowchart for process 1000 for securing an application extension in accordance with one or more of the various embodiments. After a start block, at block 1002, in one or more of the various embodiments, an application extension may be installed or instantiate in an application. As described above, applications may be host application extensions. In one or more of the various embodiments, the application may be arranged to request content for application extensions from an application extension server. In some embodiments, the application extension shell may be instantiated with a first CSP and the application extension body may be instantiated in the application extension shell with a second CSP.

At block 1004, in one or more of the various embodiments, the application may be arranged to enable one or more features of the application extension to execute. In one or more of the various embodiments, generally, instantiated application extensions may be enabled to perform various actions, such as, displaying user interfaces that access or visualize data/information provided by the application. Further, in some embodiments, application extensions may be enabled to generated one or more network requests depending on the security/sandbox policies that may be associated with a given application extension.

At decision block 1006, in one or more of the various embodiments, if a sandbox violation occurs, control may flow to block 1008; otherwise, control may loop back to block 1004. In one or more of the various embodiments, a sandbox violation may be triggered if an action associated with the application extension exceeds or violates the application extension shell CSP or the application extension body CSP. For example, if the application extension body attempts to exfiltrate data from the application to a third-party location, a sandbox violation will occur. Also, in some embodiments, if the application extension attempts load content from places other than the application extension server, a sandbox violation may occur.

At block 1008, in one or more of the various embodiments, the application may be arranged to block the execution of one or more features of the application extension that may be in violation of the security policies associated with the application extension.

In one or more of the various embodiments, applications or application extension servers may be arranged to apply CSPs or other sandbox configuration based on configuration information. Accordingly, in some embodiments, CSPs or other sandbox configuration may be different for different applications or different application extensions.

In one or more of the various embodiments, the application extension shell may be arranged to prevent one or more actions that otherwise may be performed by the application extension body. In some embodiments, since the application extension shell is provided by the application extension server and not the extension author, the CSP associated with the application extension shell may be arranged to restrict the actions of the application extension body. Thus, in some embodiments, if the extension author includes violating content or actions in the application extension body, the application extension shell may automatically prevent the violating content or actions from executing.

At block 1010, in one or more of the various embodiments, optionally, the application may be arranged to terminate or disable the application extension.

Note, this block is denoted as optional because in some embodiments applications may be arranged to omit the actions associated with this block.

At block 1012, in one or more of the various embodiments, optionally, the application may be arranged to provide one or more reports or notifications in response to the security violation associated with the application extension.

Note, this block is denoted as optional because in some embodiments applications may be arranged to omit the actions associated with this block.

Next, in one or more of the various embodiments, control may be returned to a calling process.

FIG. 11 illustrates a flowchart for process 1100 for sandboxed application extensions in accordance with one or more of the various embodiments. After a start block, at block 1102, in one or more of the various embodiments, an application may be arranged to provide an HTTP request to a URL associated with an application extension server. In one or more of the various embodiments, application users may be enabled to select one or more application extensions to install or activate. In some embodiments, one or more application extensions may be automatically selected based on configuration information. In some embodiments, one or more application extensions that may be configured to be default extensions that may automatically activate.

Accordingly, in one or more of the various embodiments, the application may be arranged to generate an HTTP request to request the application extension contents from an application extension server. In some embodiments, the HTTP request may include one or more identifiers associated with the selected application extension. Also, the HTTP request may be communicated to a network address that may be associated with the application extension server. For example, in some embodiments, the HTTP request may appear as follows: /sandbox/extension-id/main.html In one or more of the various embodiments, additional information may be included in the HTTP request, including, user information, application information, licensing information, one or more extension parameters, or the like. In some embodiments, the form or format of the HTTP request may be defined in configuration information. Accordingly, in some embodiments, different HTTP requests or HTTP request formats may be employed for different extensions.

At block 1104, in one or more of the various embodiments, the application extension server may be arranged to provide an HTTP response that includes one or more CSP attributes and HTML for an extension shell that includes an IFRAME element. In response to the HTTP request, the application extension may generate a response that provides the application extension shell to the application. In one or more of the various embodiments, the response may include one or more attributes or values that define the CSP for the application extension shell.

At block 1106, in one or more of the various embodiments, the application may be arranged to instantiate the application extension shell and assign CSP to application extension shell. In some embodiments, extension shell may be hosted or installed in panels that may be arranged to support one or more standards based application/user-interface protocols. In some embodiments, the panels or portions of the application that is arranged to host application extensions may be arranged to automatically support HTTP and HTML. Accordingly, in some embodiments, the providers of application extensions may be enabled to author the application extensions using non-proprietary methods, such as, HTML, CSS, JavaScript, or the like.

Accordingly, in some embodiments, the content provided with the first HTTP response may include an HTML page that is instantiated in an IFRAME element that is hosted by the application. In some embodiments, the HTML page that is instantiated in the IFRAME may be considered the application extension shell.

At block 1108, in one or more of the various embodiments, the application may be arranged to provide a second HTTP request to the application extension server. In some embodiments, the second HTTP request may be directed to requesting the application extension body associated with the application extension shell.

As described above, in one or more of the various embodiments, the application extension shell that is instantiated in the application may be arranged to include an IFRAME element that has a SRC attribute value that identifies the application extension server and the extension. Accordingly, in some embodiments, since the application extension shell is a IFRAME, the application extension panel may instantiate the application extension shell. In the process of instantiating the application extension shell, the application will automatically recognize that the application extension body IFRAME element is present in the application extension shell. Accordingly, in one or more of the various embodiments, a request based on the IFRAME SRC attribute in the application extension body may be generated and provided to the application extension server.

In some embodiments, the CSP settings associated with the application extension shell restrict the application extension shell from generating requests to servers other than the application extension server that provided the application extension shell content. Accordingly, in some embodiments, if the IFRAME SRC attribute included in the application extension shell references a different server or network location (e.g., rather than the application extension server that provided the application extension shell), the normal operation of the application panel may be to block the request or otherwise disable it from executing. For example, in some embodiments, the CSP settings associated with the application extension shell may be arranged to enable the scripts or markup code in the application extension shell to access URLs associated with the application extension server while restricting access to URLs unassociated with the application extension server.

For example, if the initial request for the application extension shell was https://extension.server/extension-A/main.html, the request URLs directed to a server named extension.server may be allowed while request URLs directed to other locations, such as, https://other.server/data-exfiltrator/action may be automatically disabled.

At block 1110, in one or more of the various embodiments, the application extension server may be arranged to provide an HTTP response that includes one or more CSP attributes and HTML for the application extension body. In one or more of the various embodiments, the application extension server may be arranged to process HTTP requests directly. Alternatively, in some embodiments, application extension servers may be arranged to employ a private communication channel to communicate with a web server that may handle HTTP requests. For example, the application extension server may be integrated with a web server. The web server may handle the HTTP protocol and content serving while the application extension server may select, determine, or filter, the extension related content and provide it to the web server. In other embodiments, the application extension server may also be a web server.

Accordingly, in some embodiments, the application extension server may interpret the request for the application extension body and provide the corresponding content. Also, in some embodiments, the application extension server may set one or more HTTP response headers to include a second CSP for the extension body.

At block 1112, in one or more of the various embodiments, the application may be arranged to assign the second CSP to the application extension body and instantiate the application extension body using the content (e.g., HTML, CSS, or the like) provided by the application extension server.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing application behavior using one or more processors that execute instructions to perform actions, comprising:
    providing a first request to an extension server, wherein the first request includes information that identifies an extension of a hosting application;
    employing information included in a first response to instantiate an extension shell that corresponds to the extension and embed it in the hosting application, wherein the extension shell is associated with a first security policy included in the first response, and wherein the first security policy is employed to restrict an extension body corresponding to the extension shell from navigating away from the hosting application or the extension server;
    enabling the extension body to access one or more prescribed application resources, wherein the one or more prescribed application resources include one or more application programming interfaces (APIs) that enable controlled access to one or more application resources;
    providing a second request to the extension server based on information included in the extension shell, wherein the second request includes an identifier associated with the extension body that corresponds to the extension shell;
    employing additional information included in a second response to instantiate the extension body and embed it in the extension shell, wherein the extension body is associated with a second security policy that is included in the second response, wherein the second security policy is employed to restrict network access of the extension body; and
    employing one or more of the first security policy or the second security policy to enable one or more of the extension shell or the extension body to just access the hosting application or just access the extension server.

2. The method of claim 1, wherein providing the first request further comprises, providing a Hypertext Transfer Protocol (HTTP) request that includes a Uniform Resource Locator (URL) associated with the extension server and the extension.

3. The method of claim 1, wherein providing the second request to the extension server further comprises:
    providing a Uniform Resource Locator (URL) associated with the extension server and the extension body based on information corresponding to an IFRAME tag included in the extension shell; and
    providing a Hypertext Transfer Protocol (HTTP) request that includes the URL to the extension server.

4. The method of claim 1, wherein instantiating the extension body embedded in the extension shell, further comprises:
    providing one or more additional requests to the extension server based on information in the extension body, wherein the one or more of the first security policy or the second security policy enable the one or more additional requests to reach a network address associated with the extension server, and wherein the one or more of the first security policy or the second security policy disable the one or more requests from reaching network addresses unassociated with the extension server; and
    employing one or more additional responses to instantiate one or more portions of the extension body.

5. The method of claim 1, wherein the one or more of the first security policy or the second security policy are compatible with one or more computer security standards, wherein the one or more computer security standards include Content Security Policy (CSP).

6. A processor readable non-transitory storage media that includes instructions for managing application behavior, wherein execution of the instructions by one or more processors, performs actions, comprising:
providing a first request to an extension server, wherein the first request includes information that identifies an extension of a hosting application;
employing information included in a first response to instantiate an extension shell that corresponds to the extension and embed it in the hosting application, wherein the extension shell is associated with a first security policy included in the first response, and wherein the first security policy is employed to restrict an extension body corresponding to the extension shell from navigating away from the hosting application or the extension server;
enabling the extension body to access one or more prescribed application resources, wherein the one or more prescribed application resources include one or more application programming interfaces (APIs) that enable controlled access to one or more application resources;
providing a second request to the extension server based on information included in the extension shell, wherein the second request includes an identifier associated with the extension body that corresponds to the extension shell;
employing additional information included in a second response to instantiate the extension body and embed it in the extension shell, wherein the extension body is associated with a second security policy that is included in the second response, wherein the second security policy is employed to restrict network access of the extension body; and
employing one or more of the first security policy or the second security policy to enable one or more of the extension shell or the extension body to just access the hosting application or just access the extension server.

7. The media of claim 6, wherein providing the first request further comprises, providing a Hypertext Transfer Protocol (HTTP) request that includes a Uniform Resource Locator (URL) associated with the extension server and the extension.

8. The media of claim 6, wherein providing the second request to the extension server further comprises:
providing a Uniform Resource Locator (URL) associated with the extension server and the extension body based on information corresponding to an IFRAME tag included in the extension shell; and
providing a Hypertext Transfer Protocol (HTTP) request that includes the URL to the extension server.

9. The media of claim 6, wherein instantiating the extension body embedded in the extension shell, further comprises:
providing one or more additional requests to the extension server based on information in the extension body, wherein the one or more of the first security policy or the second security policy enable the one or more additional requests to reach a network address associated with the extension server, and wherein the one or more of the first security policy or the second security policy disable the one or more requests from reaching network addresses unassociated with the extension server; and
employing one or more additional responses to instantiate one or more portions of the extension body.

10. The media of claim 6, wherein the one or more of the first security policy or the second security policy are compatible with one or more computer security standards, wherein the one or more computer security standards include Content Security Policy (CSP).

11. A system for managing application behavior:
a client computer, comprising:
a transceiver that communicates over the network;
a memory that stores at least instructions; and
one or more processors that execute instructions that perform actions, including:
providing a first request to an extension server, wherein the first request includes information that identifies an extension of a hosting application;
employing information included in a first response to instantiate an extension shell that corresponds to the extension and embed it in the hosting application, wherein the extension shell is associated with a first security policy included in the first response, and wherein the first security policy is employed to restrict an extension body corresponding to the extension shell from navigating away from the hosting application or the extension server;
enabling the extension body to access one or more prescribed application resources, wherein the one or more prescribed application resources include one or more application programming interfaces (APIs) that enable controlled access to one or more application resources;
providing a second request to the extension server based on information included in the extension shell, wherein the second request includes an identifier associated with the extension body that corresponds to the extension shell;
employing additional information included in a second response to instantiate the extension body and embed it in the extension shell, wherein the extension body is associated with a second security policy that is included in the second response, wherein the second security policy is employed to restrict network access of the extension body; and
employing one or more of the first security policy or the second security policy to enable one or more of the extension shell or the extension body to just access the hosting application or just access the extension server; and
a network computer, comprising:
a transceiver that communicates over the network;
a memory that stores at least instructions; and
one or more processors that execute instructions that perform actions, including:
providing one or more of the first response or the second response.

12. The system of claim 11, wherein providing the first request further comprises, providing a Hypertext Transfer Protocol (HTTP) request that includes a Uniform Resource Locator (URL) associated with the extension server and the extension.

13. The system of claim 11, wherein providing the second request to the extension server further comprises:
providing a Uniform Resource Locator (URL) associated with the extension server and the extension body based on information corresponding to an IFRAME tag included in the extension shell; and
providing a Hypertext Transfer Protocol (HTTP) request that includes the URL to the extension server.

14. The system of claim 11, wherein instantiating the extension body embedded in the extension shell, further comprises:

providing one or more additional requests to the extension server based on information in the extension body, wherein the one or more of the first security policy or the second security policy enable the one or more additional requests to reach a network address associated with the extension server, and wherein the one or more of the first security policy or the second security policy disable the one or more requests from reaching network addresses unassociated with the extension server; and employing one or more additional responses to instantiate one or more portions of the extension body.

15. The system of claim 11, wherein the one or more of the first security policy or the second security policy are compatible with one or more computer security standards, wherein the one or more computer security standards include Content Security Policy (CSP).

16. A client computer for managing application behavior, comprising:
   a transceiver that communicates over the network;
   a memory that stores at least instructions; and
   one or more processors that execute instructions that perform actions, including:
      providing a first request to an extension server, wherein the first request includes information that identifies an extension of a hosting application;
      employing information included in a first response to instantiate an extension shell that corresponds to the extension and embed it in the hosting application, wherein the extension shell is associated with a first security policy included in the first response, and wherein the first security policy is employed to restrict an extension body corresponding to the extension shell from navigating away from the hosting application or the extension server;
      enabling the extension body to access one or more prescribed application resources, wherein the one or more prescribed application resources include one or more application programming interfaces (APIs) that enable controlled access to one or more application resources;
      providing a second request to the extension server based on information included in the extension shell, wherein the second request includes an identifier associated with the extension body that corresponds to the extension shell;
      employing additional information included in a second response to instantiate the extension body and embed it in the extension shell, wherein the extension body is associated with a second security policy that is included in the second response, wherein the second security policy is employed to restrict network access of the extension body; and
      employing one or more of the first security policy or the second security policy to enable one or more of the extension shell or the extension body to just access the hosting application or just access the extension server.

17. The client computer of claim 16, wherein providing the first request further comprises, providing a Hypertext Transfer Protocol (HTTP) request that includes a Uniform Resource Locator (URL) associated with the extension server and the extension.

18. The client computer of claim 16, wherein providing the second request to the extension server further comprises:
   providing a Uniform Resource Locator (URL) associated with the extension server and the extension body based on information corresponding to an IFRAME tag included in the extension shell; and
   providing a Hypertext Transfer Protocol (HTTP) request that includes the URL to the extension server.

19. The client computer of claim 16, wherein instantiating the extension body embedded in the extension shell, further comprises:
   providing one or more additional requests to the extension server based on information in the extension body, wherein the one or more of the first security policy or the second security policy enable the one or more additional requests to reach a network address associated with the extension server, and wherein the one or more of the first security policy or the second security policy disable the one or more requests from reaching network addresses unassociated with the extension server; and
   employing one or more additional responses to instantiate one or more portions of the extension body.

20. The client computer of claim 16, wherein the one or more of the first security policy or the second security policy are compatible with one or more computer security standards, wherein the one or more computer security standards include Content Security Policy (CSP).

* * * * *